March 26, 1968  J. K. HAGGERTY ET AL  3,375,433
DEVICE FOR CONTROLLING THE OUTPUT FREQUENCY
OF A GENERATOR DRIVEN BY A WOUND
ROTOR INDUCTION MOTOR
Filed Oct. 5, 1964  4 Sheets-Sheet 1

INVENTORS.
ROBERT E. WHITE,
JAMES J. UNGER,
PETER C. McHALE,
LEONARD A. LOWE &
JOHN K. HAGGERTY
BY
Tilberry & Body
ATTORNEYS

FIG. 2A

INVENTORS,
ROBERT E. WHITE,
JAMES J. UNGER,
PETER C. McHALE,
LEONARD A. LOWE &
JOHN K. HAGGERTY
BY *Tilberry & Body*
ATTORNEYS March 26, 1968 J. K. HAGGERTY ETAL 3,375,433
DEVICE FOR CONTROLLING THE OUTPUT FREQUENCY
OF A GENERATOR DRIVEN BY A WOUND
ROTOR INDUCTION MOTOR
Filed Oct. 5, 1964 4 Sheets-Sheet 4

FIG. 4

SYNCHRONIZING
VECTOR DIAGRAM

INVENTORS.
ROBERT E. WHITE,
JAMES J. UNGER,
PETER C. McHALE,
LEONARD A. LOWE &
JOHN K. HAGGERTY

BY *Tillery & Body*

ATTORNEYS

United States Patent Office 3,375,433
Patented Mar. 26, 1968

3,375,433
DEVICE FOR CONTROLLING THE OUTPUT FREQUENCY OF A GENERATOR DRIVEN BY A WOUND ROTOR INDUCTION MOTOR
John K. Haggerty, Chagrin Falls, Leonard A. Lowe, Mentor, Peter C. McHale, South Euclid, James J. Unger, Cleveland Heights, and Robert E. White, Euclid, Ohio, assignors to The Electric Products Company, Cleveland, Ohio, a corporation of Ohio
Filed Oct. 5, 1964, Ser. No. 401,531
26 Claims. (Cl. 322—32)

ABSTRACT OF THE DISCLOSURE

There is provided a device for maintaining within a preselected range the output frequency of a generator driven by a wound rotor induction motor having a secondary torque controlling circuit. This device comprises means for generating a signal corresponding to the output frequency of the generator, and the secondary circuit includes a plurality of separate impedance control circuits with the impedance of these control circuits determining the torque the motor exerts on the generator. In each of the control circuits there is provided a silicon controlled rectifier with a gate and an anode-cathode path in series in the circuit. A trigger circuit connected to each of the gates supplies a turn-on signal to the gate in each of the control circuits during a portion of the positive half cycle of the control circuits. There is also provided a means for shifting the position of this signal with respect to the positive half cycle in response to the frequency corresponding signal to compensate for variations in the frequency of the generator output.

Disclosure

This invention pertains to the art of electrical controls and more particularly to a device for controlling the output frequency of a generator driven by a wound rotor induction motor.

The present invention is particularly applicable to controlling the output frequency of a generator driven by a wound rotor induction motor and it will be described with particular reference thereto; however, it will be appreciated that the invention has much broader applications and, in accordance with some aspects of the invention, it may be utilized in controlling the torque and/or speed of a wound rotor induction motor drivingly coupled to a variety of loads.

It has become somewhat common practice in industry to provide a motor-generator set for converting three phase line voltage to a single or multi-phase voltage having a frequency substantially different from the frequency of the line voltage. In the operation of such a motor-generator set, it has become a somewhat standard requirement that the output frequency of the generator be maintained substantially constant while the generator is feeding widely varying loads and while the input frequency and voltage to the motor varies. To maintain substantially constant output frequency for the generator, a wound rotor induction motor having a torque controlling secondary circuit has often been used to drive the generator. The torque of such an induction motor can be conveniently controlled by varying the impedance of the secondary circuit to compensate for variations in the output frequency of the generator. Thus, automatic control of the generator output frequency is accomplished by a device which varies the impedance within the secondary circuit of the motor as the output frequency of the generator varies from a desired value. In the past, such devices have had various limitations. For instance, they have generally been quite expensive to produce and install, they have required a substantial amount of maintenance and adjustment during operation and/or they have allowed the output frequency of the generator to vary beyond the desired limits. Consequently, these devices have not been completely successful for use in controlling the output frequency of a generator. Many companies, and even the government, have been devoting considerable effort toward the perfection of a control device of the wound rotor motor driven type and of other types to accurately maintain a constant output frequency with variable input voltage and frequencies and/or with variable loads. These efforts have been unsuccessful prior to the present invention.

The disadvantages mentioned above and others of the prior devices for controlling the secondary circuit of a wound rotor motor, and more especially, for controlling the output frequency of a generator with variable operating conditions, have been overcome by the present invention which is directed toward a device for controlling the output frequency of a generator which device includes a wound rotor induction motor for driving the generator, silicon controlled rectifiers, or equivalent electron valve elements, in the secondary rotor circuit of the motor and means for controlling the silicon controlled rectifiers in response to the output frequency of the generator, or in response to deviations of the output frequency of the generator from a desired frequency.

In accordance with the present invention there is provided a device for controlling the output frequency of a generator driven by a wound rotor induction motor, the motor having a secondary torque controlling circuit, the device comprises a means for generating a signal corresponding to the output frequency of the generator, the secondary circuit of the motor comprises a plurality of separate impedance control circuits with the impedance of these control circuits determining the torque which the motor exerts on the generator, a silicon controlled rectifier with a control gate in each of the control circuits, a trigger circuit connected to each of the gates for supplying a turn-on signal to the gates of the silicon controlled rectifiers during a portion of the positive half cycle in the control circuits and across the rectifiers, and means for shifting the position of the turn-on signal with respect to the positive half cycle across the rectifiers in response to the frequency corresponding signal. When the silicon controlled rectifiers are on, i.e. they are conducting, the impedance in the control circuits is low and when they are off, i.e. they are non-conducting, the impedance in these circuits is high; therefore, the shifting of the turn-on signal changes the average amount of time that the rectifiers are conducting and changes the average current flow in the secondary circuit of the motor. In this manner, the torque exerted by the motor on the generator is varied to compensate for changes in the output frequency of the generator.

In accordance with another aspect of the present invention, there is provided a device for controlling the output frequency of a generator driven by a wound rotor induction motor, the motor having a secondary torque controlling circuit, the device comprising a means for generating a signal corresponding to the output frequency of the generator, the secondary circuit of the motor comprising a plurality of separate impedance control circuits with the impedance of these control circuits determining the torque which the motor exerts on the generator, an electron valve with a control element in each of the control circuits, a trigger circuit connected onto each of the control elements for supplying a turn-on signal to the electron valves during a portion of the positive half cycle in the control circuits and across the valves, means for shifting the position of the turn-on signal with respect to the positive half cycle across the valves and in response to the frequency corresponding signal, and a circuit responsive to the voltages within the secondary circuit for turning the valves on irrespective of the position of the turn-on signal coming from the various trigger circuits.

In accordance with this aspect of the invention, when the induction motor is being started, the high voltages within the secondary circuit will actuate the electron valves, irrespective of the signal being received by the valves from the various trigger circuits. In this manner, the electron valves are immediately turned on, i.e. they are rendered conductive, so that high currents flow in the secondary circuit of the motor. These high currents cause an immediate exertion of a high torque on the generator. Consequently, the high voltages within the secondary circuit of the wound rotor motor are applied across conducting electron valves so that they do not damage the control valves. If such high voltages were applied across non-conducting electron valves, the voltage rating of the valves could be exceeded and the valves could be destroyed.

In accordance with still a further aspect of the present invention, there is provided a three phase, wound rotor induction motor including a secondary torque controlling circuit having three separate impedance circuits, an electron valve with a control element in each impedance circuit, a trigger circuit connected to each of the control elements for firing the individual electron valves, and a circuit in each trigger circuit to shift the time for firing the electron valve with respect to the positive half cycle across the valve being controlled by each of the triggers. The shifting circuit in each trigger circuit including a capacitor, a charging circuit for the capacitor, an output circuit for firing the valve being controlled upon discharge of the capacitor, means for discharging the capacitor when the capacitor has charged to a given value and means for changing the charging rate of the capacitor when the torque of the motor is to be changed.

In accordance with the aspect of the invention as defined above, a wound rotor induction motor has a secondary impedance circuit controlled by use of an electron valve in each phase of the secondary control circuit. The particular moment at which these electron valves are fired is determined by a phase shifting means including, essentially, a capacitor that discharges after it has reached a given charge voltage and means for changing the rate of charging of the capacitor for changing the point at which the electron valves are fired.

In accordance with still a further aspect of the present invention there is provided a thre phase wound rotor induction motor including a secondary torque controlling circuit having three separate impedance circuits connected in a Y configuration, an electron valve with a control element in each of the impedance circuits, a trigger circuit connected to each of the control elements for firing the electron valves and a circuit in each of the trigger circuits to shift the time for firing the electron valves with respect to the positive half cycle across the electron valves. The shifting circuits include a circuit for synchronizing the firing of each of the electron valves of the various trigger circuits connected to the valves with respect to the voltage across the valves. Each of the synchronizing circuits includes two transformer secondaries in series with one of the secondaries having a voltage corresponding to a first phase-to-phase voltage within the motor secondary and the other of the transformer secondaries having a voltage corresponding to a second phase-to-phase voltage within the motor secondary, with the summation of the first and second phase-to-phase voltages resulting in a phase-to-neutral voltage corresponding to the phase-to-neutral voltage in one of the impedance circuits, and a circuit for passing only one half cycle of the resulting phase-to-neutral voltage to create a synchronizing pulse for each of the trigger circuits.

By constructing the control device in accordance with this aspect of the invention, the secondary of the wound rotor induction motor may be connected in a Y configuration with the trigger circuits controlled by transformer primaries connected in a delta configuration. The provision of a Y to delta relationship between the secondary circuit of the motor and the control device for the electron valves prevents damaging and erratic harmonic voltages in the control circuit for the motor secondary circuit and lessens distortion in the power supply for the motor. By providing the novel phase shifting circuit, as defined above, each trigger circuit operating the electron valves in the separate phases of the secondary circuit are synchronized so that the firing pulses will be directed toward the electron valves during the period when a positive half cycle is imposed across the valves.

The primary object of the present invention is the provision of a device for controlling the output frequency of a generator driven by a wound rotor induction motor, which device is stable in operation, requires a minimum of maintenance and maintains the frequency of the generator within preselected, narrow limits.

Another object of the present invention is the provision of a device for controlling the output frequency of a generator which device allows easy parallel connection of a number of generators controlled by the device.

Still another object of the present invention is the provision of a device for controlling the output frequency of a generator within close limits with widely varying input voltage, input frequency, and/or loads on the generator.

Another object of the present invention is the provision of a device for controlling the output frequency of a generator which device is lightweight and requires a considerably less space than prior devices used for this general purpose.

Yet another object of the present invention is the provision of a device for controlling the output frequency of a generator which device eliminates distortion of the power supply to the generator, even when the supply power has a low voltage and a low frequency.

Another object of the present invention is the provision of a device for controlling the output frequency of a generator which device includes a wound rotor induction motor for driving the generator and which device is easily packaged as an integral part of the motor-generator set.

Another object of the present invention is the provision of a device for controlling the output frequency of a generator driven by a wound rotor induction motor, which device includes electron valves in the secondary of the wound rotor induction motor and a trigger circuit for firing each of the electron valves with a timing sequence that will cause the motor to exert the desired torque on the generator to produce the desired generator output frequency.

Another object of the present invention is the provision of a device for controlling the output frequency of a generator driven by a wound rotor induction motor, which device includes electron valves in the secondary of the wound rotor induction motor, a trigger circuit for firing each of the electron valves and capacitor means for shifting the firing point of the electron valves in response to variations in the output frequency of the generator.

Still another object of the present invention is the provision of a wound rotor induction motor having a torque controlling secondary circuit with at least three impedance control circuits with the impedance of the control circuits being controlled by silicon controlled rectifiers in series with each branch of the secondary circuit.

Yet another object of the present invention is the provision of a wound rotor induction motor having a torque controlling secondary circuit with the impedance of the secondary being controlled by electron valves having variable firing points determined by the rate of charging of a capacitor.

These and other objects and advantages will become apparent from the following description used to illustrate the preferred embodiment of the present invention as read in connection with the accompanying drawings in which.

Figures 1, 3:
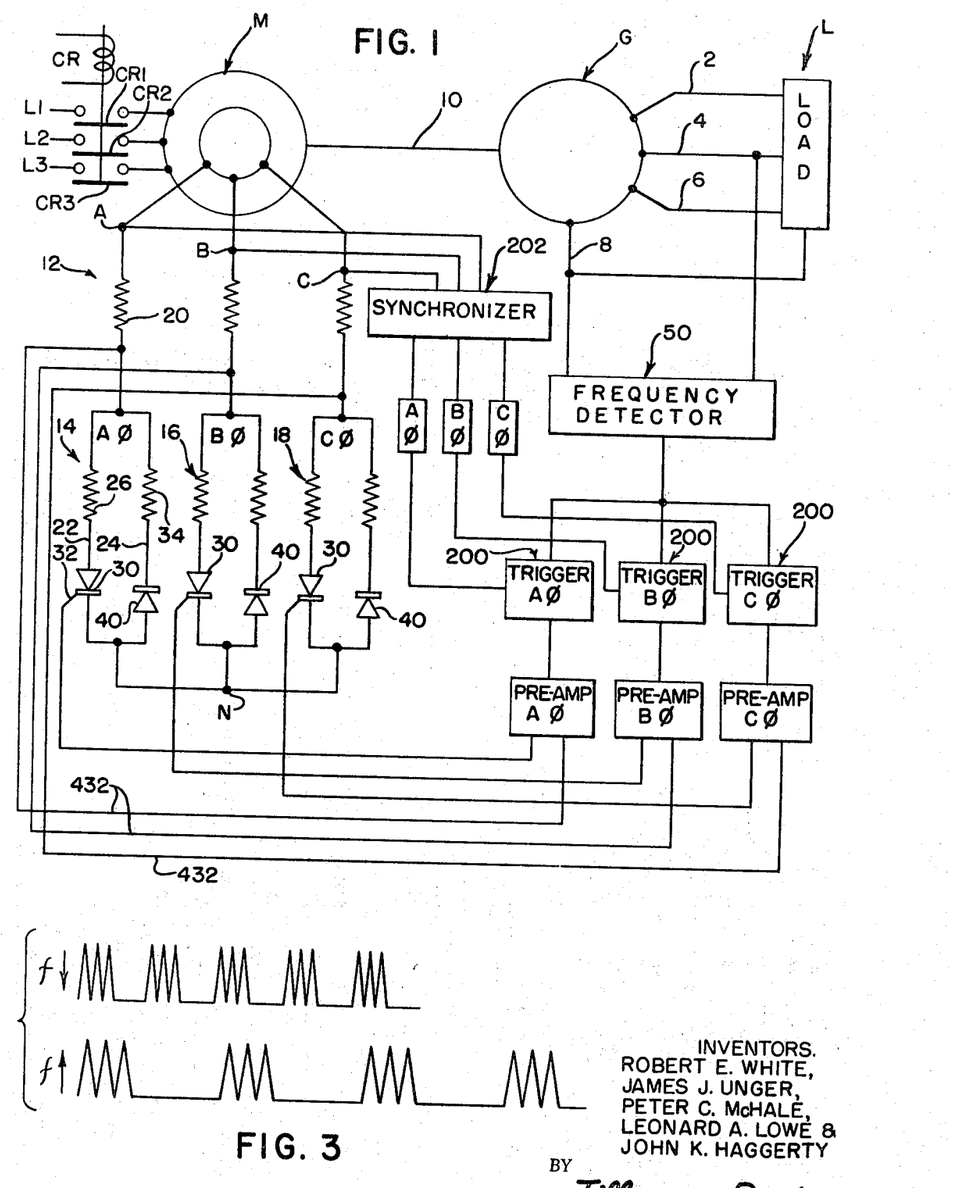
FIGURE 1 is a schematic, partial block diagram illustrating the preferred embodiment of the present invention.
FIGURE 3 is a schematic graph illustrating the output of the frequency detector utilized in the present invention.
Figure 2:
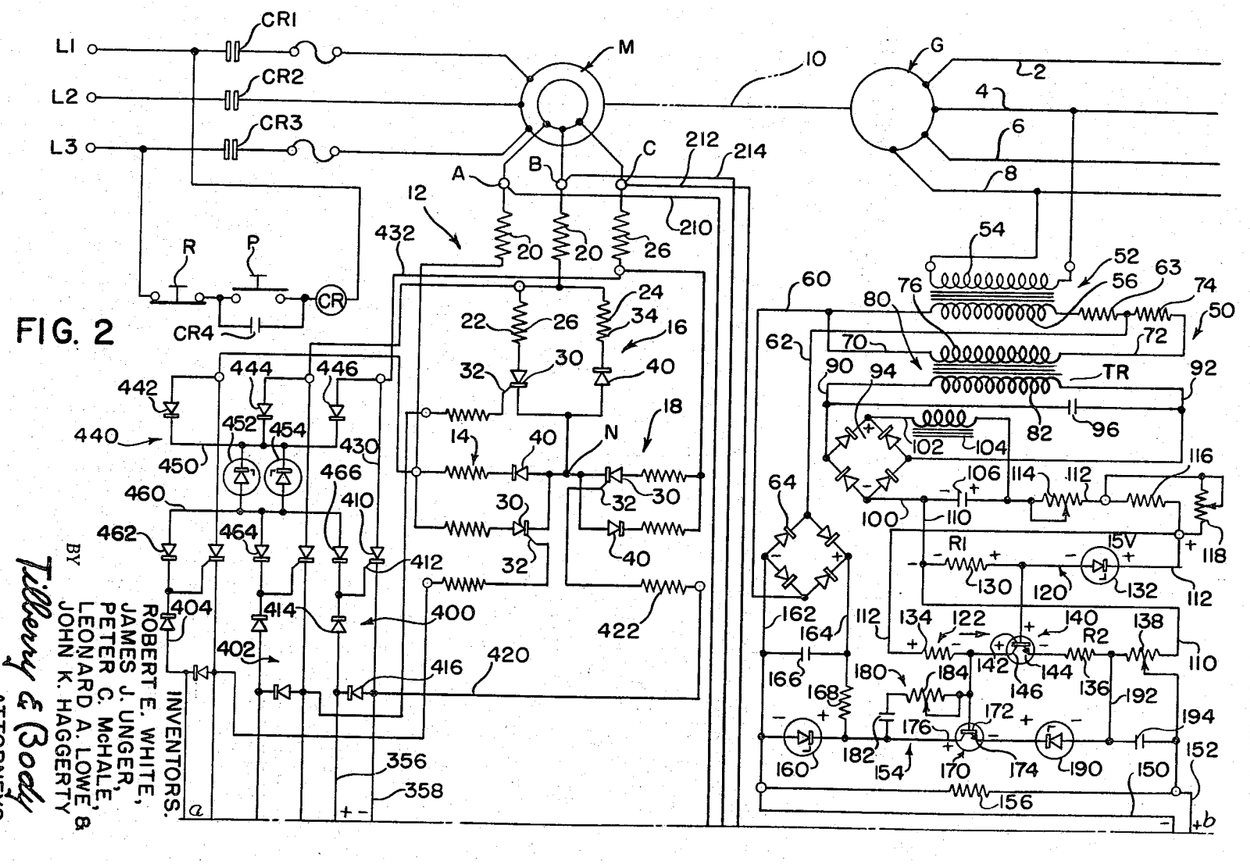
FIGURE 2 is a portion of the wiring diagram of the preferred embodiment of the present invention as shown in FIGURE 1.
Figure 2A:
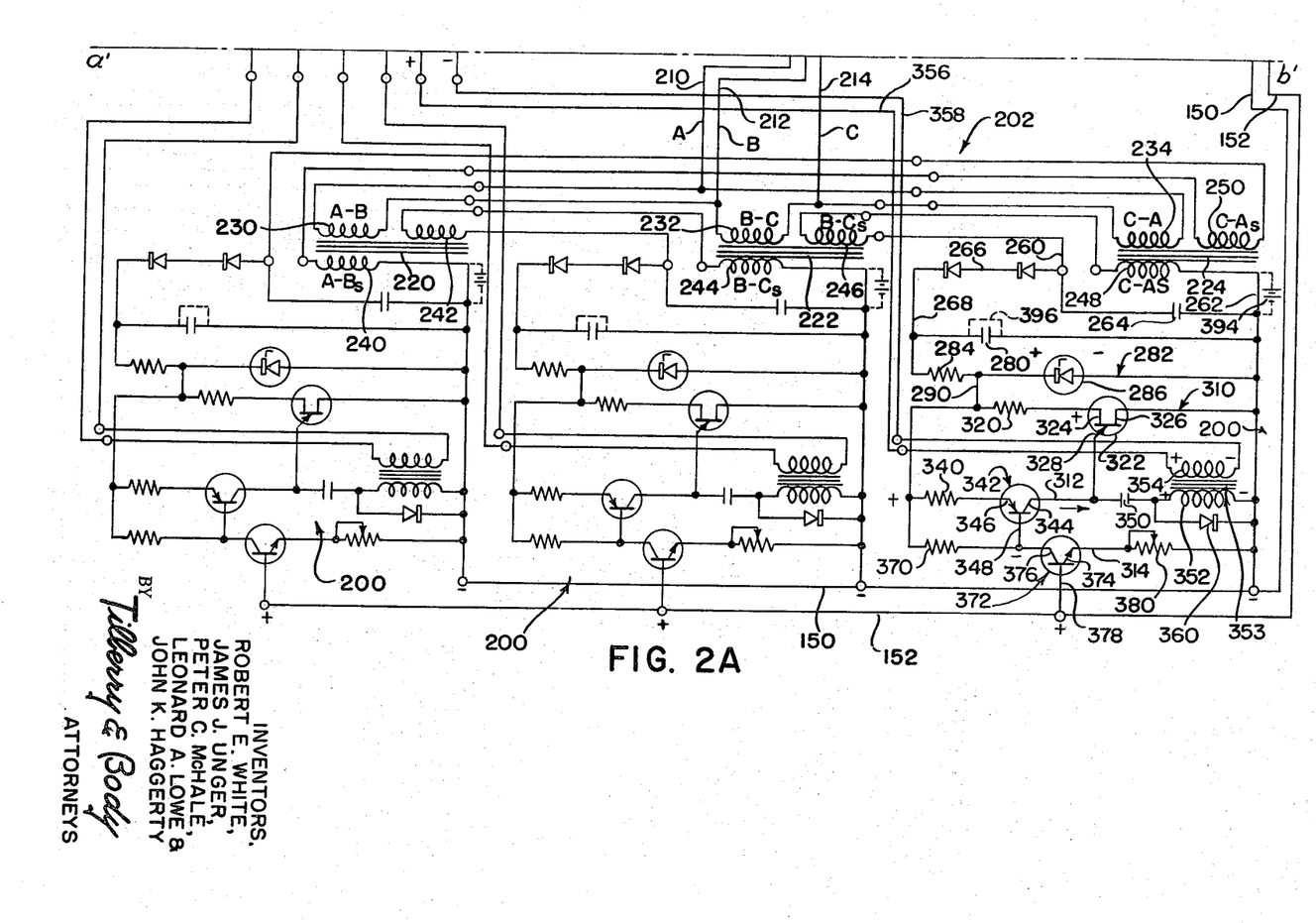
FIGURE 2A is the remaining portion of the wiring diagram as shown in FIGURE 2.

Referring now to the drawings, wherein the showings are for the purpose of illustrating a preferred embodiment of the invention only and not for the purpose of limiting same, FIGURES 1, 2 and 2A, show a three phase, wound rotor induction motor M drivingly connected onto generator G by a drive shaft 10 whereby alternating current is supplied to a load L through the output lines 2, 4, 6 and 8 of generator G. Only one generator G is shown, however, it is to be appreciated that a number of these generators may be connected in parallel without departing from the present invention. The motor M is started by closing switch P which actuates relay CR to close normally opened contacts CR1, CR2 and CR3. This connects input lines L1, L2 and L3 with the input of motor M. Also, relay CR closes contact CR4 which holds the circuit around switch P. To stop motor M, switch R is opened to de-energize relay CR and open contacts CR1, CR2, CR3 and CR4. It is appreciated that various arrangements could be utilized for starting motor M and that the circuit shown in the drawings is only representative in nature.

The wound rotor induction motor M has a secondary circuit 12 with three separate branches commencing at terminals A, B and C and electrically connected in a Y configuration at neutral point N to define an A–N branch 14, a B–N branch 16 and a C–N branch 18. Each of these phase-to-neutral phase branches in the secondary circuit 12 are provided with an arrangement for adjusting the amount of current flow therethrough which adjusted current flow controls the output torque which motor M exerts on shaft 10 and, thus, on generator G. Since the three branches within circuit 12 are substantially identical, only branch 16 will be described in detail; and this description will apply equally to the other branches.

Branch 16, which includes the B–N phase, comprises a current limiting resistor 20, which also assists in power factor correction at the motor input, and a pair of parallel legs 22, 24. Within the leg 22 there is provided a resistor 26 and a silicon controlled rectifier 30 having a control gate 32. Leg 24, which shunts leg 22, includes a resistor 34 and a diode 40 with the polarity of the silicon controlled rectifier 30 and the diode 40 being opposite so that current can, under certain conditions, flow through branch 16 irrespective of the polarity of the voltage applied thereacross. The silicon controlled rectifier 30 will control the amount of current flow in branch 16 only when the voltage across branch 16 has a polarity reverse to the polarity which will pass a forward current through diode 40.

In operation of the branch 16, the silicon controlled rectifier 30 is fired during a positive half cycle of voltage across branch 16. When rectifier 30 is fired, current will flow through the rectifier in branch 16 and through the diodes 40 in the other two branches 14 and 18. In this manner, the rectifier 30 may be controlled over the complete positive half cycle, i.e. 180°. If the parallel diodes 40 were not connected across the silicon controlled rectifiers during certain portions of the positive half cycle across the various rectifiers there would be no return path for the current through the rectifiers and the rectifiers would not fire. For this reason, the provision of the parallel diodes forms an important aspect of the invention. Another advantage of the parallel or shunting diodes 40 is that the voltage drop across these diodes is the maximum reverse bias which can be applied to the silicon controlled rectifiers 30 so that the rectifiers cannot be damaged by excessive reverse biasing during the operation of the secondary circuit 12.

The resistors 20, 26 add resistance in series with the silicon controlled rectifiers 30 so that the power factor of the installation is more favorable. A plurality of parallel silicon controlled rectifiers 30 could be placed within each leg 22 with appropriate current dividing resistors, i.e. a number of resistors 26, so that there is current sharing between the separate rectifiers. This would allow the use of rectifiers having a lesser current rating.

The average current flow in branches 14, 16 and 18 determines the torque exerted by motor M on shaft 10; therefore, if the silicon controlled rectifiers 30 of these branches are fired early in the positive half cycle of the voltage across the rectifiers, a greater current flow is provided through the various branches and the torque of the motor is increased. If the silicon controlled rectifiers are fired later in the positive half cycle of voltage across the various branches, a lesser current flows through the separate branches and a lesser torque is exerted by the motor on the shaft. In accordance with the invention, there is provided a novel arrangement for shifting the firing point of the silicon controlled rectifiers 30 and, particularly, for shifting the firing point of the rectifiers in relation to a signal which is responsive to the output frequency of generator G. In this manner, the torque of the motor M is increased when the output frequency of the generator decreases and the torque of the motor M is decreased when the output frequency of the generator increases.

Referring now to FIGURE 2, in accordance with the invention, a frequency detector 50 is utilized for generating a signal which is proportional to the output frequency of the generator G. In accordance with the illustrated embodiment of the invention, a power transformer 52 includes a primary 54 connected across lines 4, 8 of generator G and a secondary 56 adapted to introduce power across lines 60, 62 coupled through resistor 63 onto the input of a full wave rectifier 64, the function of which will be explained later. Also across the secondary 56 there are provided lines 70, 72 coupled through resistor 74 onto a primary 76 of a saturable transformer 80. The saturable transformer is provided with a secondary 82 having a voltage which is proportional to the generator output frequency with the output voltage of the secondary 82 decreasing with decreases in the output frequency and increasing with increases in the output frequency. Transformer secondary 82 is coupled by lines 90, 92 onto the input of a full wave rectifier 94 having a negative output lead 100 and a positive output lead 102 including a choke 104.

Leads 100, 102 are connected across capacitor 106 so that the lines 110, 112 will be provided with a substantially unidirectional voltage determined by the output frequency of the generator. Positive line 112 includes a rheostat 114, resistor 116 and rheostat 118 in parallel with the resistor 116. The two rheostats 114, 118 are utilized for adjusting the desired output frequency which is to be controlled.

Also across lines 110, 112 there are provided two parallel branches 120, 122. Branch 120 includes a voltage dividing resistor 130 and a zener diode 132 which is reversely biased between lines 110, 112 and has a breakdown voltage of approximately 15 volts. Since zener diode 132 will have a substantially constant voltage drop at all times, the voltage across resistor 130 will vary in accordance with the voltage across capacitor 106, which is varied by the output frequency of generator G. The other parallel branch 122 includes a resistor 134, a resistor 136, a rheostat 138 and a transistor 140 having a base 142 connected onto branch 120 between resistor 130 and zener diode 132, an emitter 144 and a collector 146. The impedance of the transistor 140 is determined by the voltage across resistor 130 with increasing voltage across the resistor decreasing the impedance across the transistor 140.

Frequency detector 50 has a negative output line 150 and a positive output line 152 across which there is an output branch 154 in parallel with an output resistor 156. Within branch 154 there is provided a zener diode 160 connected across lines 162, 164 extending from the output of rectifier 64. A capacitor 166 and resistor 168 form a filter and current limiting arrangement for the output of the rectifier 64. Also within branch 154 there is provided a transistor 170 having a base 172 connected onto branch 120 between resistor 134 and transistor 140, an emitter 174 and a collector 176. A collector to base feedback circuit 180 for transistor 170 includes a capacitor 182 and a rheostat 184 for feedback adjustment. In the emitter circuit of transistor 170 there is provided a zener diode 190 connected in reverse polarity across lines 150, 152. A line 192 connects branch 154 with branch 122 between resistor 136 and rheostat 138. The rheostat 138 includes a capacitor shunt 194.

In operation of frequency detector 50, as the output frequency of generator G decreases, the voltage across capacitor 106 decreases. This decreases the voltage across resistor 130 so that a lesser bias is applied to base 142 of transistor 140. This increases the voltage drop across the transistor 140 and resistor 136 which increases the forward bias of transistor 170. Consequently, the transistor 170 collector current increases and the voltage across lines 150, 152 increases. In summary, the voltage output across lines 150, 152 increases with the decrease in the output frequency of generator G. This condition is illustrated in the upper graph of FIGURE 3.

As the output frequency of generator G increases, the output voltage across lines 150, 152 goes down proportionally. This is explained by realizing that the voltage across capacitor 106 will increase with an increase in the generator output frequency. This imposes a greater voltage across resistor 130 which increases the bias on transistor 140. Accordingly, in general operation of frequency detector 50, as the output frequency of the generator G drops in relation to the preselected value set by rheostat 114, the voltage level of the signal across lines 150, 152 increases. In a like manner, as the output frequency of the generator G rises, the voltage level of the signal across lines 150, 152 decreases.

From the above discussion, it is appreciated that the effective voltage across lines 150, 152 is increased with decreasing output frequencies of the generator and is decreased with increasnig output frequencies of the generator. In this manner, a voltage signal is generated by frequency detector 50 which voltage signal controls other circuits of the preferred embodiment of the invention as hereinafter described in detail.

The frequency responsive signal across lines 150, 152 is introduced into each of the trigger circuits 200, one of which is provided for firing each of the silicon controlled rectifiers 30 in the secondary circuit 12 of motor M. Before describing in detail the trigger circuits 200, as shown in FIGURE 2A, the synchronizer 202 will be described because the synchronizer is utilized in powering the trigger circuits and in coordinating the turnon signal of the trigger circuit with respect to the positive half cycle of voltage applied across the particular silicon controlled rectifier 30 being controlled by the trigger circuit. The synchronizer 202 includes lines 210, 212 and 214 connected onto terminals A, B and C, respectively. Transformers 220, 222, and 224 are operably associated with the trigger circuits 200 with one transformer being utilized by each of said trigger circuits. Primaries 230, 232 and 234 of these transformers are connected in delta with lines 210, 212 and 214 so that the voltage applied to the transformers by the primaries has phases AB, BC and CA instead of the phases across branches 14, 16 and 18 which are AN, BN, and CN, respectively. Since the primaries are not in phase with the voltages applied across branches 14, 16 and 18, the synchronizer 202, by transformer action, reconverts the AB, BC and CA phases into AN, BN and CN in a manner to be hereinafter described.

Each transformer includes two secondaries which are designated as 240, 242 on transformer 220, 244, 246 on transformer 222 and 248, 250 on transformer 224. These six secondaries are connected in series pairs with two secondaries being utilized for powering each of the trigger circuits 200.

Figure 4:
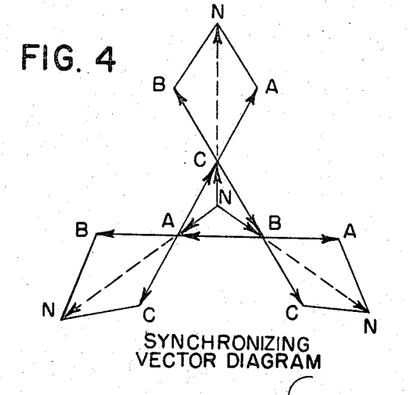
FIGURE 4 is a vector diagram illustrating the synchronizing feature of the present invention.

Referring now to FIGURE 4, there is illustrated a vector diagram showing the operation of synchronizer 202. The voltages within branches 14, 16 and 18 are voltages AN, BN and CN whereas the voltages across the primaries in the synchronizers are AB, BC and CA as shown in the central triangle of the vector diagram in FIGURE 4. The synchronizer produces a resulting voltage in each trigger circuit which resulting voltage is in phase with the voltage flowing through the silicon controlled rectifier being operated by that particular trigger circuit. For instance, referring now to trigger circuit 200 at the right of FIGURE 2A, this trigger circuit is utilized for firing the silicon controlled rectifier 30 within branch 18. In other words, the silicon controlled rectifier being controlled by the right hand trigger circuit of FIGURE 2A has a voltage CN as shown in FIGURE 4. In order to provide the trigger circuit, at the right of FIGURE 2A, with a voltage in phase with voltage CN, the secondaries 246 and 248 are connected in electrical series with the input of this particular trigger circuit.

Figure 5:
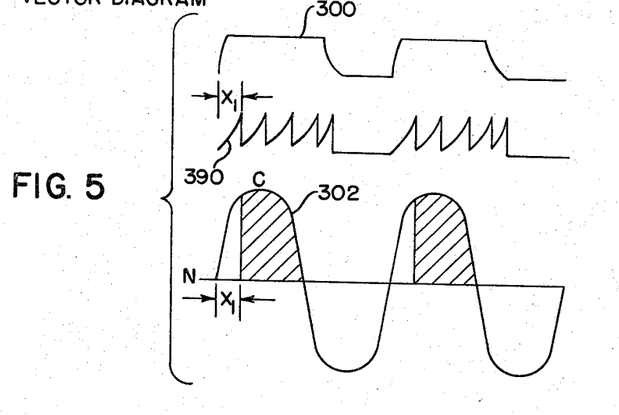
FIGURE 5 is a graphic illustration showing certain operating characteristics of the present invention.
Figure 6:
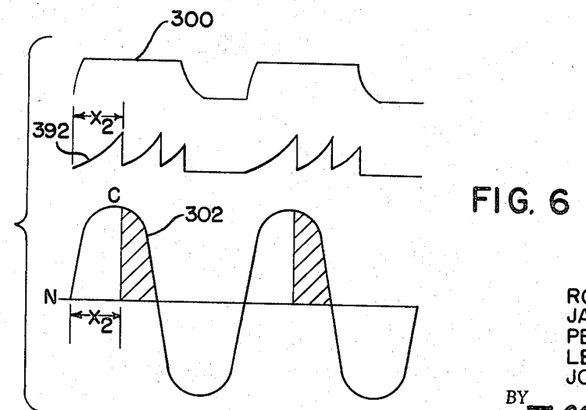
FIGURE 6 is a graphic illustration showing similar operating characteristics to those shown in FIGURE 5 with a different operating condition.

The voltages in these two secondaries are CA and CB as shown in the upper portion of the diagram in FIGURE 4 with the result that the summation of these two phase-to-phase voltages within the secondaries 246, 248 is a phase-to-neutral voltage CN as shown in the upwardly extending dashed line in FIGURE 4. It is noted that this voltage CN, shown as a dashed line, is in phase with the solid line voltage CN within the triangle ABC. Consequently, the voltage imposed upon the right hand trigger circuit shown in FIGURE 2A is in phase with the phase-to-neutral voltage being applied across branch 18 of secondary 12. This feature is illustrated in FIGURES 5 and 6 where the pulse 300 is shown to be in phase with the positive half cycle 302 of the voltage CN across branch 18. The spread of pulse 300 is somewhat greater than the width of the positive half cycle 302 for a reason to be hereinafter described in detail.

Each of the other trigger circuits 200 is provided with a resulting phase-to-neutral voltage obtained by two series connected secondaries which resulting voltage is in phase with the phase-to-neutral voltage being applied across the silicon controlled rectifier being triggered by that particular trigger circuit. By connecting the branches within the secondary circuit 12 in a Y configuration and the primaries of the synchronizer in a delta configuration, the transients or harmonics fed from the secondary circuit to the trigger circuits 200 are considerably reduced.

Since each of the three trigger circuits 200, shown in FIGURE 2A, are substantially identical, only the trigger circuit shown to the right in FIGURE 2A will be described in detail and this description will apply equally to the other two trigger circuits.

Figure 7:
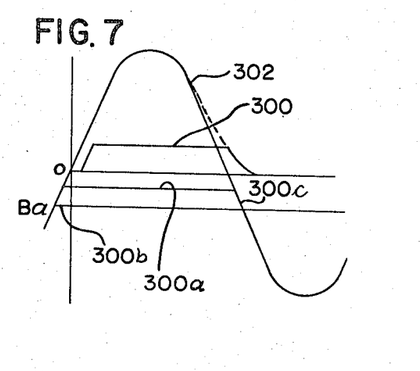
FIGURE 7 is a graphic illustration of the operating characteristics of a modification of the present invention.

The resulting phast-to-neutral voltage from the synchronizer 202 is applied by lines 260, 262 across capacitor 264. A half wave rectifier 266 is placed within line 268 extending from the line 260 so that a half cycle, in this case the positive half cycle, is imposed across capacitor 280 connected between lines 262, 268. This capacitor 280 performs the function of spreading the width of the positive half cycle beyond 180°; for a purpose to be hereinafter described. The pulse formed across capacitor 280 is imposed across branch 282 including a voltage dividing resistor 284 and a zener diode 286. The zener diode acts as a clipper so that the voltage across lines 262 and 290 has a given magnitude determined by the break-down voltage of zener diode 286. Any increase in voltage between lines 262, 268 will appear across resistor 284 and will not affect the voltage across lines 262, 290. The clipped pulse applied across lines 262, 290 is shown as pulse 300 in FIGURES 5 and 6. This pulse has an initial front generally matching the initial portion of the positive half cycle 302 across the branch 18; however, the capacitor 280 causes trailing edge of the pulse to remain longer than the positive half cycle 302. Referring to FIGURE 7, the initial wave front of pulse 300 is slightly offset from voltage 302 because of the capacitive reactance of the capacitor 280; however, for the purpose of this discussion, it can be here assumed that this offset does not take place. A modification of the invention to correct this offset will be hereinafter described. The spreading of the trailing wave front of pulse 300 is clearly shown in FIGURE 7. The purpose for this increase in the trailing length of pulse 300 is to provide an accurate firing of the silicon controlled rectifiers 30 over the complete 180° of the positive half cycle across the silicon controlled rectifiers. If the pulses 300 had a length corresponding exactly to the positive half cycle 302, for a reason to be hereinafter apparent, it may be difficult, if not impossible, to fire the silicon controlled rectifiers at the final portion of the positive half cycle.

Across lines 262, 290, which receive pulses 300 as shown in FIGURES 5 and 6, there are provided three branches 310, 312 and 314. The first of these branches, 310, includes a resistor 320 and a unijunction transistor 322 having a first base 324, a second base 326 and an emitter 328 with the pulse 300 not being able to cause current flow across the unijunction transistor 322 until the emitter 328 is supplied with a given amount of current. Branch 312 includes a resistor 340, a transistor 342 having an emitter 344, a collector 346 and a base 348, a capacitor 350 and a primary 352 of transformer 353. The transformer also includes a secondary 354 connected across lines 356, 358 which comprise the output of the trigger circuit 200.

Branch 314 includes a resistor 370, a transistor 372 having an emitter 374, a collector 376 and a base 378, and a rheostat 380.

In operation of trigger circuit 200, the voltage signal across lines 150, 152 positively biases transistor 372 which causes a voltage to appear across the plate-collector circuit of transistor 342. This in turn charges capacitor 350. The capacitor 350 cannot discharge through emitter 328 and base 326 until the voltage across the capacitor reaches the breakdown voltage of the unijunction transistor 322. At that time, the capacitor 350 discharges through the unijunction transistor and through the primary 352 which causes a signal to be induced in secondary 354, which signal appears across lines 356, 358. The pulses 300 charge capacitor 350 to the discharge voltage of unijunction transistor 322 at a rate determined by the transistors 342 and 372. The rate of charging of the capacitor is determined by the current through transistor 342 which is controlled by the voltage applied by lines 150, 152 across transistor 372. The voltage signal for controlling transistor 372 is determined by the output frequency of the generator G, as explained before. The pulse 300 appears across lines 262, 290 and has a voltage level to cause rapid charging of capacitor 350; however, the amount or level of the voltage applied across the capacitor 350 is determined by the current flow through transistor 342 which is controlled by transistor 372 and, thus, by the signal across lines 150, 152.

The operation of the capacitor 350 is best shown in FIGURES 5 and 6. Referring more particularly to FIGURE 5, when the biasing voltage of transistor 372 is relatively high, the current flow through transistor 342 causes a charging curve 390, which is relatively steep. Consequently, the capacitor is charged to its discharge value very rapidly when a high current from the pulse 300 flows through the capacitor 350. The time for reaching the discharge voltage is represented as $X_1$. Since the pulse 300 is timed with the positive half cycle 302, the silicon controlled rectifier 30 in branch 18 fires after a time $X_1$ as shown in the lower graph of FIGURE 5. Consequently, a large current flows through the secondary 12 and a high torque is imposed by motor M on generator G. This condition is found when the output frequency of generator G is lower than regulated frequency and a high voltage signal is applied across lines 150, 152. The saw tooth effect on the top of curve 390 generally has no effect on the silicon controlled rectifier because the rectifier cannot be turned off during the positive half cycle after it is first turned on; however, the silicon controlled rectifiers could conceivably turn off and and these subsequent signals or peaks would then turn the rectifiers on again.

When the output frequency increases, the voltage across lines 150, 152 decreases; therefore, the forward bias on transistor 372 is decreased. This causes a lower voltage across capacitor 350 and, thus, a more gradual charging curve 392, as shown in FIGURE 6. Consequently, the capacitor 350 does not reach the discharge value for time represented by $X_2$. In like manner, the silicon controlled rectifier is not turned on or fired until the positive half cycle has progressed a time $X_2$. It is appreciated from this discussion that the signal from the frequency detector 50 changes the charging rate of capacitor 350 and changes the firing position of the particular silicon controlled rectifier being actuated by the trigger circuit.

Pulse 300 is spread by capacitor 280 so that the silicon controlled rectifier may be fired at any position along the 180° of the positive half cycle. If pulse 300 were not spread, with a relatively slow charging rate for firing at the end of the positive half cycle, the charging rate may not be sufficiently high to cause discharge of the capacitor before the pulse 300 starts it downward movement. For this reason, in accordance with the preferred embodiment of the invention, the pulse 300 is spread at the trailing end thereof by capacitor 280 to provide control of the silicon controlled rectifier at the far end of the positive half cycle.

When using capacitor 280 for spreading pulse 300, only the trailing end of the pulse is increased in length. The initial portion of the pulse is offset, as shown in FIGURE 7. Consequently, firing of the silicon controlled rectifiers 30 at the first part of the positive half cycle 302 is difficult, if not impossible. To overcome this difficulty, a modification of the invention, as so far described, is contemplated. A battery 394, or another D.C. source, is connected in line 262, as shown in dashed lines, and capacitor 280 is removed from the circuit as schematically shown by means of dashed line shunt 396. The battery is so polarized to shift the base line from O to B$a$ as shown in FIGURE 7. Consequently, more than the positive half cycle of the rotor voltage is passed by rectifier 266 and the pulse 300$a$ is wider than the positive half cycle of this voltage. Pulse 300$a$ has an increased initial portion 300$b$ and an increased trailing portion 300$c$ so that control of the silicon controlled rectifiers 30 is possible both at the initial and trailing ends of the positive half cycles across these rectifiers 30. The advantage of this arrangement is obvious.

The signal appearing across lines 356, 358 may be relatively weak when compared to the voltage required to fire silicon controlled rectifier 30. Consequently, in accordance with the illustrated embodiment of the present invention as shown in FIGURE 2, there are provided preamplifiers 400, 402 and 404 one of which is connected to each of the silicon controlled rectifiers in secondary circuit 12. Each of these preamplifiers is connected across lines 356, 358 so that the signal across these lines is amplified before being directed to a gate 32 of a silicon controlled rectifier in the secondary circuit 12. Since each of these preamplifiers is substantially identical, only preamplifier 400 will be described in detail and this description will apply equally to the other preamplifiers. There is included a silicon controlled rectifier 410 with a gate 412 which gate is subjected to the trigger signal across lines 356, 358 through a signal passing diode 414. There is provided a signal blocking diode 416 that prevents the signal from passing directly to the control line 420. The control line 420 is, in turn, connected onto gate 32 of branch 18 through a current limiting resistor 422. Consequently, when a signal is applied across lines 356, 358, the silicon controlled rectifier 410 is fired to impose a high voltage on gate 32. To supply the power to silicon controlled rectifier 410 there is provided a power line 430 connected to line 432 and, thus, to terminal C through resistor 20. It is appreciated that the preamplifiers may be eliminated if the signal issuing from the trigger circuits 200 is sufficiently high to actuate or fire the silicon controlled rectifiers 30 in the secondary circuit 12.

It has been found in practice that relatively high voltages are imposed on secondary circuit 12 during the starting of motor M. If the silicon controlled rectifiers 30 are not conducting, a relatively high voltage is imposed across these rectifiers. To prevent this relatively high voltage, there is provided, in accordance with the invention, a novel circuit for firing the silicon controlled rectifiers in the preamplifier circuits and, thus, the silicon controlled rectifiers in the secondary circuit during starting of the motor M. This starting circuit is designated generally at 440 and it is shown in FIGURE 2. Diodes 442, 444 and 446 combine to form a three phase, half wave rectifier with an output line 420. This output line 420 is connected by zener diodes 452, 454 onto a line 460. The line 460 is coupled through diodes 462, 464 and 466 with the gate 412 of the silicon controlled rectifier 410 within the preamplifier circuits 400, 402 and 404. When a high voltage is created within the secondary circuit 12, the zener diodes break-down to allow current flow from line 450 to line 460, which current flow passes through the diodes 462, 464 and 466 to immediately actuate silicon controlled rectifiers 410. This actuates the silicon controlled rectifiers 30 within secondary circuit 12. The impedance across these conducting rectifiers is reduced, which reduces the voltage imposed across the rectifiers. In this manner, a high torque is immediately exerted on shaft 10. As the speed of motor M increases the voltages within secondary circuit 12 fall and when they are reduced below a given value, the zener diodes 452, 454 stop conducting and control of the silicon controlled rectifiers 30 is again accomplished by the trigger signal across lines 356, 358.

In general operation of the control device as described above, the output frequency of generator G is converted into a voltage signal across lines 150, 152 by the frequency detector 50. This signal is utilized to change the charging rate of capacitor 350 in trigger circuits 200 so that the silicon controlled rectifiers 30 within secondary circuit 12 are fired at a time determined by the output frequency of the generator. In this manner, when the frequency varies, the amount of current flow in the secondary 12 is correspondingly changed to impose a corrective change in the torque exerted by motor M on shaft 10.

A plurality of generators G could be connected in parallel onto lines 2, 4, 6 and 8. An appropriate means such as a signal light can then be used to indicate whether all generators are synchronized. If not synchronized, a control in detector 50 could be adjusted to bring each generator into the proper phase and frequency.

It is appreciated that this invention has been described in connection with a preferred embodiment and that various changes in this embodiment may be made without departing from the intended spirit and scope of the present invention as defined by the appended claims.

Having thus described our invention, we claim:

1. A device for maintaining with a preselected range the output frequency of a generator driven by a wound rotor induction motor, said motor having a secondary torque controlling circuit, said device comprising: a means for generating a signal corresponding to the output frequency of said generator, said secondary circuit comprising a plurality of separate impedance control circuits with the impedance of these control circuits determining the torque said motor exerts on said generator, a silicon controlled rectifier with a control gate in each of said control circuits, each of said silicon controlled rectifiers having an anode-cathode path connected in series in said control circuit, a trigger circuit connected to each of said gates for supplying a turn-on signal to the gate in each of said control circuits during a portion of the positive half cycle in said control circuits, and means for shifting the position of said turn-on signal with respect to said positive half cycle in response to said frequency corresponding signal to compensate for variations in said frequency.

2. A device for controlling the output frequency of a generator driven by a wound rotor induction motor, said motor having a secondary torque controlling circuit, said device comprising: a means for generating a signal corresponding to the output frequency of said generator, said secondary circuit comprising a plurality of separate impedance control circuits with the impedance of these control circuits determining the torque said motor exerts on said generator, a silicon controlled rectifier with a control gate in each of said control circuits, each of said silicon controlled rectifiers having an anode-cathode path connected in series in said control circuit, a trigger circuit connected to each of said gates for supplying a turn-on signal to the gate in each of said control circuits during a portion of the positive half cycle in said control circuits, and means in each of said trigger circuits for shifting the position of said turn-on signal with respect to said positive half cycle in response to said frequency corresponding signal, said shifting means including an input for receiving said frequency responsive signal, a capacitor charged at a rate determined by said frequency responsive signal, a circuit for discharging said capacitor after said capacitor has been charged to a given value, and a circuit for converting said capacitor discharge into said turn-on signal.

3. A device for controlling the output frequency of a generator driven by a wound rotor induction motor, said motor having a secondary torque controlling circuit, said device comprising: a means for generating a signal corresponding to the output frequency of said generator, said secondary circuit comprising a plurality of separate impedance control circuits with the impedance of these control circuits determining the torque said motor exerts on said generator, a silicon controlled rectifier with a control gate in each of said control circuits, each of said silicon controlled rectifiers having an anode-cathode path connected in series in said control circuit, a trigger circuit connected to each of said gates for supplying a turn-on signal to the gate in each of said control circuits during a portion of the positive half cycle in said control circuits, and means in each of said trigger circuits for shrifting the position of said turn-on signal with respect to said positive half cycle in response to said frequency corresponding signal, said shifting means including an input for receiving said frequency responsive signal, a capacitor charged at a rate determined by said frequency responsive signal, a circuit for discharging said capacitor after said capacitor has been charged to a given value, a circuit for converting said capacitor discharge into said turn-on signal and circuit means for synchronizing said turn-on signal with said positive half cycle within said control circuit controlled by said trigger circuit, said synchronizing means including a circuit for applying a pulse, having voltage less than said given value, across said capacitor at substantially the same time as said positive half cycle appears across said control circuit being controlled by said trigger circuit.

4. A device as defined in claim 3 wherein said synchronizing pulse circuit includes a pulse spreading capacitor with said pulse having a duration substantially longer than the duration of said positive half cycle in said control circuit being controlled by said trigger circuit.

5. A device as defined in claim 3 wherein said synchronizing pulse circuit includes a means for spreading said pulse so that said pulse has a duration substantially longer than the duration of said positive half cycle in said control circuit being controlled by said trigger circuit.

6. A device as defined in claim 3 wherein there are three of said impedance control circuits with said control circuits being connected in a Y configuration and said synchronizing pulse circuit includes two transformer secondaries in series with one of said transformer secondaries having a voltage corresponding to a first phase-to-phase voltage within said secondary circuit and the other of said transformer secondaries having a voltage corresponding to a second phase-to-phase voltage within said secondary circuit, with the summation of said first and second phase-to-phase voltages in said transformer secondaries resulting in a phase-to-neutral voltage corresponding to the phase-to-neutral voltage in one of said control circuits, a rectifier circuit for passing only one half cycle of said resulting phase-to-neutral voltage to said capacitor and a clipper circuit for limiting said passed half cycle of said resulting phase-to-neutral voltage before said half cycle is applied to said capacitor.

7. A device for maintaining with a preselected range the output frequency of a generator driven by a wound rotor induction motor, said motor having a secondary torque controlling circuit, said device comprising: a means for generating a signal corresponding to the output frequency of said generator, said secondary circuit comprising a plurality of separate impedance control circuits with the impedance of these control circuits determining the torque said motor exerts on said generator, an electron valve with a control element in each of said control circuits, each of said valves having an anode-cathode path connected in series in said control circuit, a trigger circuit connected to each of said control elements for supplying a turn-on signal to the electron valves in each of said control circuits during a portion of the positive half cycle in said control circuits, means for shifting the position of said turn-on signal with respect to said positive half cycle in response to said frequency corresponding signal, and a circuit responsive to the voltages within said secondary circuit for turning said valves on irrespective of the position of said turn-on signal coming from said trigger circuits.

8. A device as defined in claim 7 wherein said voltage responsive circuit includes a control line connecting said secondary circuit to said control elements, a rectifier in said control line for converting the A.C. voltage of said secondary circuit to unidirectional voltage of a proper polarity to energize said electron valves and a zener diode between said rectifier and said control elements to prevent actuation of said electron valves until said unidirectional voltage exceeds a preselected value.

9. A device for controlling the output frequency of a generator driven by a wound rotor induction motor, said motor having a secondary torque controlling circuit, said device comprising: a means for generating a signal corresponding to the output frequency of said generator, said secondary circuit comprising a plurality of separate impedance control circuits with the impedance of these control circuits determining the torque said motor exerts on said generator, a silicon controlled rectifier with a control gate in each of said control circuits, each of said silicon controlled rectifiers having an anode-cathode path connected in said control circuit, a trigger circuit connected to each of said gates for supplying a turn-on signal to the gate in each of said control circuits during a portion of the positive half cycle in said control circuits, and means for shifting the position of said turn-on signal with respect to said positive half cycle in response to said frequency corresponding signal, a shunt circuit around each of said silicon controlled rectifiers, said shunt circuit including a diode for passing current in a direction reverse of said silicon controlled rectifier.

10. A device for controlling the output frequency of a generator driven by a wound rotor induction motor, said motor having a secondary torque controlling circuit, said device comprising: a means for generating a signal corresponding to the output frequency of said generator, said secondary circuit comprising a plurality of separate impedance control circuits with the impedance of these control circuits determining the torque said motor exerts on said generator, a silicon controlled rectifier with a control gate in each of said control circuits, each of said silicon controlled rectifiers having an anode-cathode path connected in said control circuit, a trigger circuit connected to each of said gates for supplying a turn-on signal to the gate in each of said control circuits during a portion of the positive half cycle in said control circuits, means for shifting the position of said turn-on signal with respect to said positive half cycle in response to said frequency corresponding signal, a preamplifier between each of said trigger circuits and the gate being controlled by said trigger circuit to amplify said turn-on signal before it is applied to said gate.

11. A three phase wound rotor induction motor including a secondary torque controlling circuit having three separate impedance circuits, an electron valve with a control element in each impedance circuit, each of said valves having an anode-cathode path in said control circuit, a trigger circuit connected to each of said control elements for firing said electron valves, and a circuit in each of said trigger circuits to shift the time for firing said electron valve with respect to the positive half cycle across said valve being controlled by each of said trigger circuits, said shifting circuit including a capacitor, a charging circuit for said capacitor, an output circuit for firing said valve being controlled upon discharge of said capacitor, means for discharging said capacitor when said capacitor has been charged to a given value and means for changing the charging rate of said capacitor when the torque of said motor is to be changed.

12. A three phase wound rotor induction motor as defined in claim 11 wherein said capacitor discharge means includes a unijunction transistor with the emitter and one base of said transistor being connected in parallel with said capacitor.

13. A three phase wound rotor induction motor as defined in claim 11 including a means for generating a signal responsive to the speed of said motor and means for converting said signal into a charging rate for said capacitor.

14. A three phase wound rotor induction motor including a secondary torque controlling circuit having three separate impedance circuits, a silicon controlled rectifier with a control gate in each of said impedance circuits, each of said silicon controlled rectifiers having an anode-cathode path connected in said control circuit, a trigger circuit connected to each of said gates for firing said silicon controlled rectifiers, and a circuit in said trigger circuit to shift the time for firing said silicon controlled rectifiers with respect to the positive half cycle across said silicon controlled rectifiers, said shifting circuit including a capacitor, a charging circuit for said capacitor, an output circuit for firing said silicon controlled rectifier being controlled upon discharge of said capacitor, a means for discharging said capacitor when said capacitor has been charged to a given value and means for changing the charging rate of said capacitor when the torque of said motor is to be changed.

15. A three phase wound rotor induction motor as defined in claim 14 wherein said capacitor discharge means includes a unijunction transistor with the emitter and one base of said transistor being connected in parallel with said capacitor.

16. A three phase wound rotor induction motor as defined in claim 15 wherein said output circuit is coupled onto a circuit including said one base and said emitter of said unijunction transistor.

17. A wound rotor induction motor as defined in claim 14 wherein a voltage pulse is imposed across said capacitor while said positive half cycle is imposed across said impedance control circuit being controlled by said trigger circuit and said charging rate changing means includes a means for changing the voltage level of said pulse as it is imposed across said capacitor.

18. A wound rotor induction motor as defined in claim 17 including a capacitor for increasing the duration of said pulse to a duration substantially longer than the duration of said positive half cycle in said control circuit.

19. A wound rotor induction motor as defined in claim 17 including a means for spreading said pulse so that said pulse has a duration substantially longer than the duration of said positive half cycle in said control circuit being controlled by said trigger circuit.

20. A wound rotor induction motor as defined in claim 17 wherein said impedance control circuits are connected in a Y configuration with said silicon controlled rectifiers being subjected to phase-to-neutral voltages, and including means for synchronizing said voltage pulses with the voltages in said control circuits and across said silicon controlled rectifiers, said synchronizing means including two transformers secondaries in series with one of said secondaries having a voltage corresponding to a first phase-to-phase voltage within said motor secondary circuit and the other of said transformer secondaries having a voltage corresponding to a second phase-to-phase voltage within said motor secondary circuit, with the summation of said first and second phase-to-phase voltages in said transformer secondaries resulting in a phase-to-neutral voltage corresponding to the phase-to-neutral voltage in one of said control circuits, a rectifier circuit for passing only one half cycle of said resulting phase-to-neutral voltage to said capacitor and a clipper circuit for limiting said passed half cycle of said resulting voltage before said half cycle is applied to said capacitor.

21. A three phase wound rotor induction motor including a secondary torque controlling circuit having three separate impedance circuits connected in a Y configuration, an electron valve with a control element in each of said impedance circuits, each of said valves having an anode-cathode path connected in said impedance circuit, a trigger circuit connected to each of said control elements, for firing said electron valves, and a circuit in each of said trigger circuits to shift the time for firing said electron valves with respect to the positive half cycle across said electron valve being controlled by each of said trigger circuits, said shifting circuit including a circuit for synchronizing the firing of each of said electron valves by the trigger circuit connected to said valve, each of said synchronizing circuits including two transformer secondaries in series with one of said secondaries having a voltage corresponding to a first phase-to-phase voltage within said motor secondary circuit and the other of said transformer secondaries having a voltage corresponding to a second phase-to-phase voltage within said motor secondary circuit, with the summation of said first and second phase-to-phase voltages in said transformer secondaries resulting in a phase-to-neutral voltage corresponding to the phase-to-neutral voltage in one of said impedance control circuits, and a circuit for passing only one half cycle of said resulting phase-to-neutral voltage to create a synchronizing pulse for said trigger circuit.

22. A three phase wound rotor induction motor as defined in claim 21 wherein said shifting circuit includes a capacitor, and means for discharging said capacitor after it is charged above a given value to fire one of said electron valves, said synchronizing pulse having a value less than said capacitor discharge value and being imposed across said capacitor and means for changing the charging rate of said capacitor when a change in the torque of said motor is desired.

23. A device for controlling the output frequency of a generator driven by a three phase wound rotor induction motor, said motor having a secondary torque controlling circuit including three separate impedance branches, said device comprising: a frequency responsive transformer having an output voltage corresponding to the frequency of said generator, a circuit for converting the output voltage of said transformer into a voltage signal, each impedance branch of said secondary circuit including a silicon controlled rectifier with a control gate, each of said silicon controlled rectifiers having an anode-cathode path connected in said impedance branch, a trigger circuit connected to each of said gates to fire said silicon controlled rectifiers when a signal is generated by said trigger circuit, said trigger circuit including an input, means for applying said voltage signal to said input, a capacitor in said trigger circuit, a circuit for discharging said capacitor when said capacitor is charged to a given value, the voltage level of said voltage signal determining the charging rate of said capacitor and, thus, the time required for said capacitor to reach said discharge value, means in said trigger circuit for generating said firing signal when said capacitor discharges, and a circuit for applying a pulse across said capacitor, said pulse having a value less than said discharge value and synchronized with the voltage across said silicon controlled rectifier being controlled by said trigger circuit.

24. A device as defined in claim 23 wherein said discharging circuit includes a unijunction transistor with a break-down voltage corresponding to said discharge value of said capacitor and said firing signal generating means including a transformer in series with said unijunction transistor with the secondary of said transformer being connected to said gate of the silicon controlled rectifier being controlled.

25. A three phase wound rotor induction motor having a secondary torque controlling circuit, said secondary circuit including three phase-to-neutral impedance branches, each of said branches including a two leg parallel circuit with an electron switching device having an anode-cathode path and connected with said path in one leg for passing current through said branch in a first direction by way of said path when said switching device is turned on and a diode in the other leg for passing current through said branch in a second direction opposite to said first direction, and means for turning said switching device on at a selected time when a voltage is applied across said branch with a polarity to cause current flow through said branch in said first direction.

26. A three phase induction motor as defined in claim 25 wherein said electron switching device is a silicon controlled rectifier having a gate and said means for turning said switching device on is a trigger circuit connected onto each of said gates.

References Cited

UNITED STATES PATENTS

| 3,151,288 | 9/1964 | Avizienis et al. | 322—28 |
| 3,154,733 | 10/1964 | Pratt | 322—28 |
| 3,200,323 | 8/1965 | Faulkes | 322—28 |
| 3,211,987 | 10/1965 | Gatlin et al. | 322—59 |
| 3,242,346 | 3/1966 | Skoubo | 322—32 |
| 3,254,293 | 5/1966 | Steinbruegge et al. | 322—28 |

LEE T. HIX, *Primary Examiner.*

R. V. LUPO, *Assistant Examiner.*